(No Model.)
J. W. JONES.
ANIMAL TRAP.
No. 371,763. Patented Oct. 18, 1887.
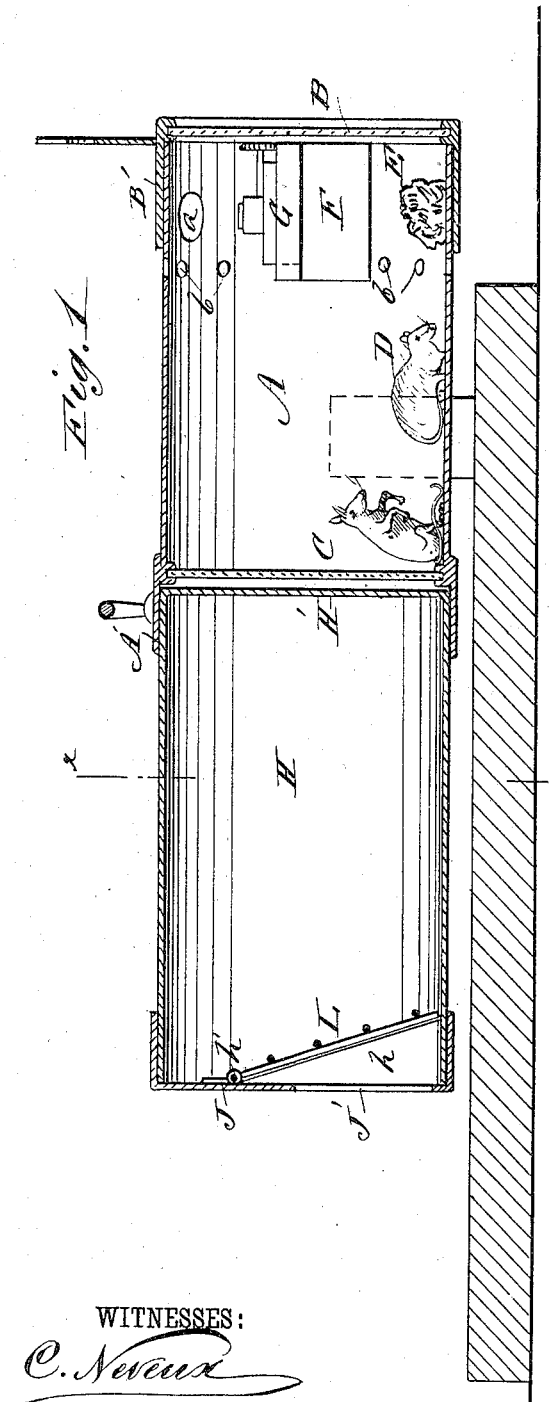
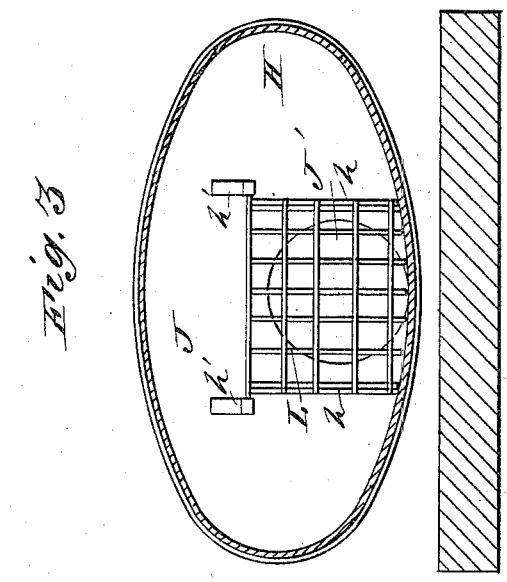
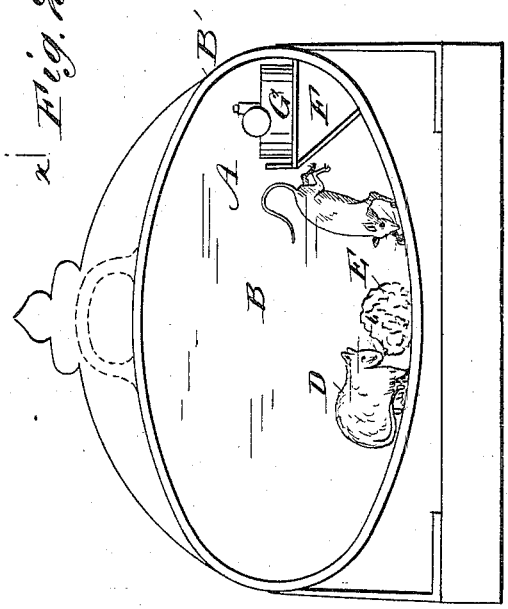
WITNESSES:
C. Neveux
C. Sedgwick
INVENTOR:
J. W. Jones
BY Munn & Co.
ATTORNEYS.

United States Patent Office.

JOHN W. JONES, OF NEW YORK, N. Y.

ANIMAL-TRAP.

SPECIFICATION forming part of Letters Patent No. 371,763, dated October 18, 1887.

Application filed February 25, 1887. Serial No. 228,869. (No model.)

*To all whom it may concern:*

Be it known that I, JOHN W. JONES, of the city, county, and State of New York, have invented a new and Improved Animal-Trap, of which the following is a full, clear, and exact description.

Reference is to be had to the accompanying drawings, forming a part of this specification, in which similar letters of reference indicate corresponding parts in all the figures.

Figure 1 is a longitudinal sectional elevation of my new and improved rat-trap. Fig. 2 is a front elevation of the same, and Fig. 3 is a transverse sectional elevation taken on the line $x\ x$ of Fig. 1.

My invention consists, principally, of a trap wherein decoys are used in the bait-chamber closed by a glass in front and provided with a mirror to reflect the decoys, a separate trap-chamber being provided to catch the animal.

The invention also consists of the construction and arrangement and combination of parts, all as hereinafter described and claimed.

A represents a decoy and bait chamber closed in front by the front glass, B, and provided at the back with the mirror C. The glass B is fitted in a cap, B', which may be removed from the wall inclosing the chamber A for placing the dummies or decoys D and the bait E in the chamber A. Upon a shelf, F, is placed a small lamp, G, to light the chamber A, and an opening, $a$, is formed in the wall of the chamber A and in the rim of the cap B' for the escape from the chamber of the products of combustion of the lamp, and small holes, $b$, are formed in the walls of the chamber A for the escape of the odor of the bait.

H is the trap-chamber, closed at the back by the wall H' and connected to the chamber A by the flange A', connected to the walls of the chamber A. To the front of the trap-chamber H is attached the removable cap J, in which is formed the aperture J' for the entrance of the animal to the trap-chamber H. Upon the inner surface of the cap J are secured the inclined flanges $h\ h$, one on each side of the opening J', and above these flanges are formed the eyes $h'\ h'$, in which is pivoted the light open gate L, which will permit the entrance of a small animal at the opening J', but in connection with the flanges $h$ will prevent his escape.

The operation of the trap will be readily understood from the drawings.

Having thus described my invention, what I claim as new, and desire to secure by Letters Patent, is—

1. An animal-trap constructed to form a bait-chamber, A, and trap chamber H, in combination with the mirror C, placed at the back of the bait-chamber, the front of the bait-chamber being transparent, substantially as described.

2. An animal-trap constructed to form a bait-chamber, A, and trap-chamber H, the chamber A having the transparent front B, in combination with the decoys D, placed in the bait chamber, substantially as described.

3. An animal-trap constructed to form a bait-chamber, A, and trap-chamber H, in combination with the mirror C at the back of the bait-chamber, the decoys D, and the transparent front B, substantially as described.

4. The chamber A, provided with the mirror C, glass front B, and lamp G, in combination with the trap-chamber H, having opening J and gate L, substantially as described.

5. An animal-trap composed of a lighted chamber, A, and the trap-chamber H, made detachable from the light-chamber and provided with a removable cover, substantially as described.

JOHN W. JONES.

Witnesses:
 H. A. WEST,
 C. SEDGWICK.